US 12,545,321 B2

(12) United States Patent
Miyama et al.

(10) Patent No.: US 12,545,321 B2
(45) Date of Patent: Feb. 10, 2026

(54) STEERING CONTROL DEVICE AND STEERING CONTROL METHOD

(71) Applicant: TOYOTA JIDOSHA KABUSHIKI KAISHA, Toyota (JP)

(72) Inventors: Keigo Miyama, Toyota (JP); Shintaro Saigo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/407,668

(22) Filed: Jan. 9, 2024

(65) Prior Publication Data
US 2024/0300579 A1 Sep. 12, 2024

(30) Foreign Application Priority Data

Mar. 8, 2023 (JP) .................................. 2023-035750

(51) Int. Cl.
*B62D 15/02* (2006.01)
*B60W 30/12* (2020.01)
*B62D 6/00* (2006.01)

(52) U.S. Cl.
CPC .......... *B62D 15/025* (2013.01); *B60W 30/12* (2013.01); *B62D 6/008* (2013.01)

(58) Field of Classification Search
None
See application file for complete search history.

(56) References Cited

U.S. PATENT DOCUMENTS

| 6,763,908 | B2 * | 7/2004 | Ogawa ................... B62D 5/008 180/443 |
| 7,692,534 | B2 | 4/2010 | Kataoka et al. |
| 8,352,124 | B2 | 1/2013 | Taguchi |
| 8,682,500 | B2 | 3/2014 | Sakugawa |
| 8,818,634 | B2 | 8/2014 | Fujita et al. |
| 9,168,953 | B2 | 10/2015 | Mitsumoto et al. |
| 9,180,908 | B2 * | 11/2015 | Van Dan Elzen .... B60W 10/20 |
| 9,714,034 | B2 | 7/2017 | Otake et al. |
| 9,880,558 | B2 | 1/2018 | Nakamura |
| 9,902,399 | B2 | 2/2018 | Torii et al. |

(Continued)

FOREIGN PATENT DOCUMENTS

| CN | 110857090 A * | 3/2020 | ............... B62D 6/00 |
| EP | 3608206 A1 * | 2/2020 | ............ B60W 30/12 |

(Continued)

*Primary Examiner* — Kevin R Steckbauer
(74) *Attorney, Agent, or Firm* — SoraIP, Inc.

(57) ABSTRACT

The steering control device includes a detection unit for detecting the lane in which the own vehicle is traveling, a reaction force device that applies a reaction force to the steering direction of the steering wheel for operating the steering device of the own vehicle, and a control unit that recognizes the position of the own vehicle in the lane based on the detection result of the lane and causes the reaction force device to output a reaction force to suppress the own vehicle from deviating from the lane. The control unit performs first control, based on the detection results, to suppress the host vehicle from deviating from the first boundary, and limits the reaction force output from the reaction force device for a predetermined time at a first timing of switching the lane deviation monitoring target from the first boundary to the second boundary.

3 Claims, 6 Drawing Sheets

(56) References Cited

U.S. PATENT DOCUMENTS

| | | | |
|---|---|---|---|
| 10,345,443 B2 | 7/2019 | Masui et al. | |
| 10,611,240 B2 | 4/2020 | Masui et al. | |
| 11,001,257 B2 * | 5/2021 | Ohmura | B62D 6/02 |
| 11,046,361 B2 * | 6/2021 | Suzuki | B62D 15/025 |
| 11,148,711 B2 * | 10/2021 | Akamatsu | B62D 6/04 |
| 11,498,617 B2 * | 11/2022 | Akamatsu | B60W 30/12 |
| 12,391,306 B2 * | 8/2025 | Sonoda | B62D 5/008 |
| 2003/0150666 A1 * | 8/2003 | Ogawa | B62D 5/008 |
| | | | 180/443 |
| 2018/0348779 A1 * | 12/2018 | Oniwa | B60T 8/17557 |
| 2020/0039511 A1 * | 2/2020 | Ohmura | B60W 40/105 |
| 2020/0247460 A1 * | 8/2020 | Suzuki | B62D 6/00 |
| 2020/0307623 A1 * | 10/2020 | Akamatsu | B60W 60/0027 |
| 2022/0024515 A1 * | 1/2022 | Akamatsu | B60W 30/10 |
| 2023/0303162 A1 * | 9/2023 | Sakai | B62D 6/008 |
| 2023/0339534 A1 * | 10/2023 | Sonoda | B62D 15/00 |
| 2024/0300579 A1 * | 9/2024 | Miyama | B62D 15/025 |

FOREIGN PATENT DOCUMENTS

| | | | | |
|---|---|---|---|---|
| EP | 3608206 B1 * | 2/2021 | | B60W 40/06 |
| JP | H1196497 A * | 4/1999 | | |
| JP | 2013184590 A * | 9/2013 | | |
| JP | 2014-118025 A | 6/2014 | | |
| JP | 2015009644 A * | 1/2015 | | |
| JP | 6212987 B2 * | 10/2017 | | |
| JP | 2023133999 A * | 9/2023 | | B60W 30/12 |
| JP | 2023139368 A * | 10/2023 | | B62D 6/008 |
| JP | 2024126958 A * | 9/2024 | | B60W 30/12 |
| WO | WO-2025069169 A1 * | 4/2025 | | B62D 6/00 |

* cited by examiner

STEERING CONTROL DEVICE AND STEERING CONTROL METHOD

CROSS-REFERENCE TO RELATED APPLICATION

This application claims priority to Japanese Patent Application No. 2023-035750 filed on Mar. 8, 2023, incorporated herein by reference in its entirety.

BACKGROUND

1. Technical Field

The present disclosure relates to a steering control device and a steering control method that generate a reaction force on a steering wheel to keep a vehicle in a lane.

2. Description of Related Art

Japanese Unexamined Patent Application Publication No. 2015-009644 (JP 2015-009644 A) discloses a technique of applying a reaction force (assist torque) with respect to the rotational direction of a steering wheel so as to keep a vehicle within a lane when the vehicle is traveling in the lane. This reaction force is applied in a direction in which the host vehicle moves away from a boundary line of the lane to a greater degree as the distance between the lateral position of the host vehicle and the boundary line is shorter. On a road where a first lane and a second lane are adjacent to each other with respect to a boundary line, a reaction force is controlled when the host vehicle travels in the first lane and makes a lane change to the second lane. When the host vehicle approaches the boundary line in the first lane, the reaction force is increased based on a predetermined reduction amount according to the distance from the boundary line.

When the host vehicle moves away from the boundary line in the second lane after the host vehicle crosses the boundary line, the reaction force is varied based on a predetermined reduction amount according to the distance from the boundary line. When the distance of the host vehicle from the boundary line is less than or equal to a predetermined value after the host vehicle crosses the boundary line, the reaction force is reduced based on a first reduction amount. When the distance of the host vehicle from the boundary line exceeds the predetermined value, the reaction force is reduced based on a second reduction amount that is larger than the first reduction amount. When the direction of the reaction force is reversed, the reaction force is reduced based on a third reduction amount until the reaction force matches a reaction force that suppresses the vehicle departing from the second lane.

SUMMARY

According to the technique described in JP 2015-009644 A, when the direction of the reaction force is reversed, the amount of variation in the reaction force is changed, and therefore the reaction force may be generated in a direction different from that expected by a driver.

An object of the present disclosure is to provide a steering control device and a steering control method that can reduce the generation of a reaction force that causes a driver to feel uncomfortable.

An aspect of the present disclosure provides a steering control device including:

a detection unit that detects a lane in which a host vehicle is traveling;

a reaction force device that applies a reaction force with respect to a steering direction of a steering wheel for operating a steering device of the host vehicle; and a control unit that recognizes a position of the host vehicle in the lane based on a detection result of the lane and that outputs the reaction force from the reaction force device in order to suppress the host vehicle departing from the lane.

The control unit is configured to: perform, based on a detection result of a pair of a first boundary and a second boundary of the lane, first control in which the reaction force is applied to the steering wheel by controlling the reaction force device in order to suppress the host vehicle departing from the first boundary, or perform second control in which the reaction force is applied to the steering wheel by controlling the reaction force device in order to suppress the host vehicle departing from the second boundary; and restrict the reaction force output from the reaction force device during a predetermined time at a first timing when a target to be monitored for departure from the lane is switched from the first boundary to the second boundary, or at a second timing when the target to be monitored for departure from the lane is switched from the second boundary to the first boundary.

According to the present disclosure, it is possible to reduce the generation of a reaction force that causes a driver to feel uncomfortable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
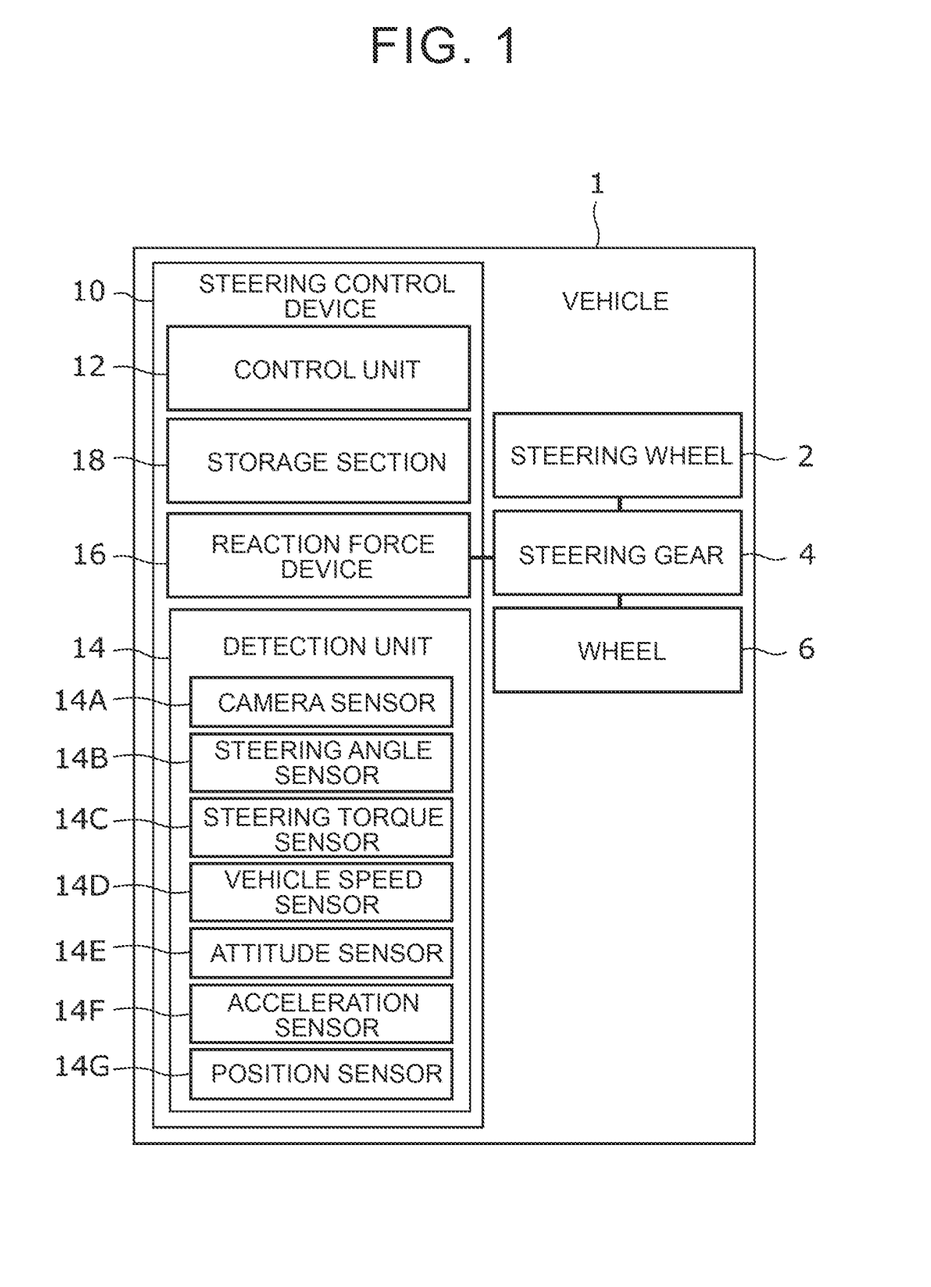
FIG. 1 is a block diagram showing the configuration of a steering control device according to an embodiment of the present disclosure.

As shown in FIG. 1, the vehicle 1 includes a steering device 4 that steers wheels 6, and a steering control device 10 provided in the steering device 4. The steering device 4 is driven when the steering wheel 2 is operated by the driver. The steering wheel 2 is connected to a steering shaft (not shown) for driving a steering device 4. The steering device 4 is provided with a steering control device 10 for providing auxiliary torque in steering the wheels 6. The wheels 6 are, for example, a pair of front wheels provided on the vehicle 1. The wheels 6 are configured to be steerable about a rotation axis in the vertical direction. The wheels 6 are steered in the steering direction by the steering device 4. The wheels 6 may include a pair of steerable rear wheels.

The steering device 4 is, for example, a rack and pinion mechanism including a rack gear and a pinion gear. The pinion gear is rotationally driven by the steering shaft. The steering shaft is connected to the steering wheel 2. When the driver performs an operation to rotate the steering wheel 2, the pinion gear rotates via the steering shaft. The rack gear moves horizontally based on the rotation of the pinion gear, and steers the wheels 6 via a link mechanism.

The steering device 4 may be configured by Steering By Wire (SBW) in which the wheels 6 are driven by a motor in conjunction with the steering wheel 2. In this case, the steering wheel 2 and the steering device 4 do not need to be connected by a steering shaft. The steering device 4 may be configured not only by the above configuration but also by other devices as long as the wheels 6 can be steered.

The steering control device 10 includes, for example, a reaction force device 16 that applies a reaction force to the steering device 4, a detection unit 14 that detects data necessary for adjusting the output amount of the reaction force, a control unit 12 that controls the reaction force device 16 based on the detection result detected by the detection unit 14, and a storage unit 18 that stores data and programs necessary for control.

As will be described later, the reaction force device 16 is configured to apply a reaction force to the steering direction of the steering wheel 2 in order to suppress the vehicle 1 from deviating from the lane. The reaction force device 16 may be configured, for example, by a power steering device that applies auxiliary torque to the operation of the steering wheel 2. The reaction force device 16 is controlled by the control unit 12. The reaction force device 16 is composed of, for example, a motor or a speed reducer. The reaction force device 16 is configured to apply an auxiliary torque to the direction of rotation of the steering shaft.

The reaction force device 16 is configured to apply a reaction force against the rotation direction opposite to the rotation direction of the steering shaft by reducing the auxiliary torque applied to the rotation direction of the steering shaft, when suppressing the vehicle 1 from deviating from the lane. When the steering device 4 is provided with a power steering device or when the steering device 4 is configured by SBW, the reaction force device 16 may be configured to apply the reaction force against a rotation direction opposite to the direction of rotation of the steering shaft.

The control unit 12 includes one or more hardware processors such as a central processing unit (CPU). The storage unit 18 includes a non-temporary storage medium such as a Hard Disk Drive (HDD) or a Solid State Disk (SSD), a Read Only Memory (ROM), or a Random Access Memory (RAM). The storage unit 18 may be provided not only in the steering control device 10 but also in a data server (not shown) that is communicably connected via the network W.

The detection unit 14 includes, for example, various sensors. The various sensors include, for example, a camera sensor 14A, a steering angle sensor 14B, a steering torque sensor 14C, a vehicle speed sensor 14D, an attitude sensor 14E, an acceleration sensor 14F, a position sensor 14G, and the like. Various detection data output from various sensors are stored in the storage unit 18 and updated as needed. The detection unit 14 may be configured not only to output detection data of various sensors but also to output detection results in conjunction with the control unit 12.

The camera sensor 14A captures an image of the external environment of the vehicle 1, for example. The camera sensor 14A captures a plurality of still images per unit time based on a predetermined frame rate, and generates image data. The frame rate is, for example, several tens of fps. The camera sensor 14A images the area in front of the vehicle 1, for example, and acquires image data in which the lane is imaged. Imaging data is stored in the storage unit 18 as needed. The imaging data stored in the storage unit 18 is held for a predetermined period of time, and then is rewritten with new data in order from the oldest data.

The steering angle sensor 14B detects the rotation angle of the steering wheel 2. The steering angle sensor 14B detects a first rotation angle of the steering wheel 2 in the clockwise rotation direction from the neutral position, and a second rotation angle in the counterclockwise rotation direction from the neutral position. The steering angle sensor 14B is configured by, for example, an encoder provided on the steering shaft. The steering angle sensor 14B detects rotation angle data of the steering wheel 2 based on a predetermined sampling rate.

The steering torque sensor 14C detects the torque applied around the rotation axis of the steering shaft when the driver operates the steering wheel 2. The steering torque sensor 14C detects a first input torque applied to the steering wheel 2 in a clockwise rotation direction from the neutral position, and a second input torque applied in a counterclockwise rotation direction from the neutral position. The detected value of the steering torque sensor 14C may be a detected value of the load of a motor that constitutes the reaction force device 16 provided in the steering device 4.

Vehicle speed sensor 14D detects the speed of vehicle 1. Vehicle speed sensor 14D detects, for example, the rotational speed of wheels 6 and the relative speed of the ground with respect to vehicle 1. The speed of the vehicle 1 may be calculated based on the acceleration sensor 14F and the position sensor 14G. In this case, the vehicle speed sensor 14D may not be provided. Attitude sensor 14E detects the attitude of vehicle 1. The attitude sensor 14E is composed of, for example, an angular velocity sensor around six axes.

Acceleration sensor 14F detects acceleration applied to vehicle 1. The acceleration sensor 14F is configured by, for example, an angular velocity sensor in three axial directions. Position sensor 14G detects the absolute position of vehicle 1. The position sensor 14G is configured by, for example, a Global Positioning System (GPS) sensor.

Figure 2:
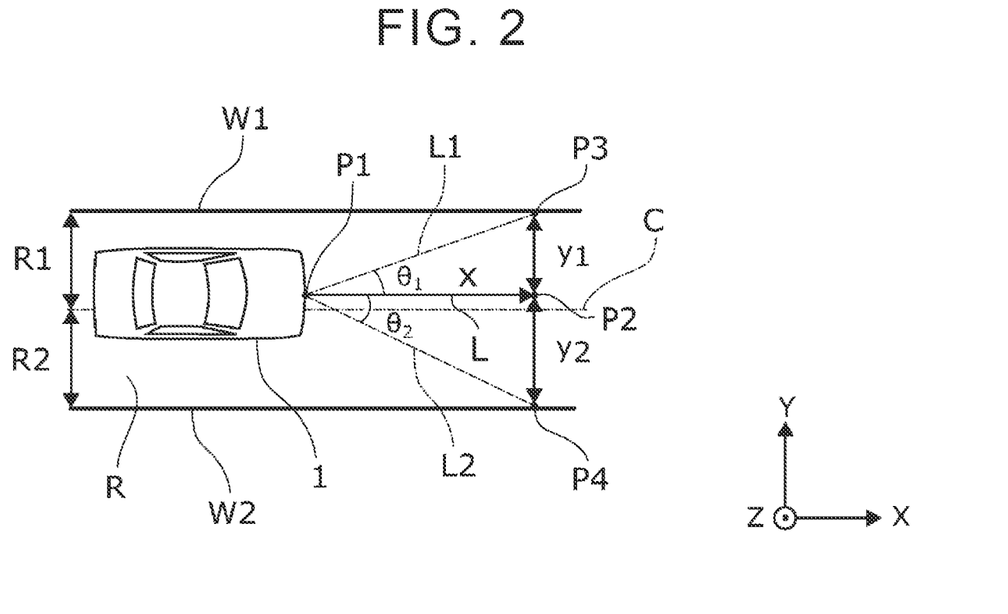
FIG. 2 is a diagram showing lanes in which vehicles travel.

As shown in FIG. 2, the vehicle 1 is traveling on lane R. Lane R is displayed by a pair of first boundaries W1 and second boundaries W2. The second boundary W2 is displayed parallel to the first boundary W1. The first boundary W1 and the second boundary W2 are lane marks in the form of white or yellow continuous lines or broken lines. The first boundary W1 is, for example, a boundary line on the left side (+Y direction in the figure) with respect to the traveling direction of the vehicle 1 (+X direction in the figure). The second boundary W2 is, for example, a boundary line on the right side (−Y direction in the figure) with respect to the traveling direction of the vehicle 1.

The control unit 12 determines the state of the vehicle 1 (own vehicle) traveling in the lane R based on the detection result detected by the detection unit 14, and executes necessary control for the vehicle 1 based on the determination result. The control unit 12 recognizes the position of the vehicle 1 in the lane R based on the detection result of the detection unit 14. For example, the control unit 12 causes the reaction force device 16 to output a reaction force in order to suppress the vehicle 1 from deviating from the lane R, based on the recognition result of the lane R.

The control unit 12 controls the reaction force device 16 based on the detection results of the first boundary W1 and the second boundary W2 to perform first control for applying reaction force to the steering wheel 2 in order to suppress the vehicle 1 from deviating from the first boundary W1. The control unit 12 controls the reaction force device 16 based on the detection results of the first boundary W1 and the second boundary W2 to perform second control for applying reaction force to the steering wheel 2 in order to suppress the vehicle 1 from deviating from the second boundary W2.

When a reaction force is output from the reaction force device 16, the driver can feel the reaction force in the opposite rotation direction to the rotation direction of the steering wheel 2. The driver can maintain the vehicle 1 within the lane R by rotating the steering wheel 2 in the opposite rotation direction to the rotation direction of the steering wheel 2.

The control unit 12 analyzes the image data captured by the camera sensor 14A. The control unit 12 detects the lane R in which the vehicle 1 travels based on the image data. The control unit 12 recognizes a first boundary W1 and a second boundary W2 indicating boundaries of the lane R based on the image data. The control unit 12 calculates a first relative position (first detected value) of the first boundary W1 with respect to the current first position P1 of the vehicle 1. The control unit 12 calculates a second relative position (second detection value) of the second boundary W2 with respect to the current first position P1 of the vehicle 1.

The control unit 12 calculates the distance in the width direction of the lane R based on the first relative position of the first boundary W1 and the second relative position of the second boundary W2. The control unit 12 calculates the center distance RI and the position of the center C in the width direction of the lane R by setting the distance in the width direction of the lane R to ½.

The control unit 12 calculates the current first position P1 of the vehicle 1 in the lane R based on the recognition results of the first boundary W1 and the second boundary W2 and other detected data. The control unit 12 calculates, for example, a future second position P2 of the vehicle 1 with respect to the lane R when the vehicle 1 moves a predetermined distance x from the current first position P1. The predetermined distance x is adjusted according to conditions such as the current speed of the vehicle 1, the current acceleration, the width of the lane R, and the attitude of the vehicle 1 with respect to the lane R.

The control unit 12 calculates a first distance y1 between the second position P2 and the first boundary W1. The control unit 12 calculates a third position P3 that is a first distance y1 from the second position P2 toward the first boundary W1 in the width direction of the lane R (Y-axis direction in the figure). The control unit 12 calculates the third position P3 based on the first position P1, the second position P2, and the first distance y1. The third position P3 is a position where the vehicle 1 deviates from the first boundary W1.

The control unit 12 calculates a straight line L connecting the first position P1 and the second position P2 and a first straight line L1 connecting the first position P1 and the third position P3. The control unit 12 calculates a first angle θ1 of the first straight line L1 with respect to the straight line L.

The control unit 12 calculates a second distance y2 between the second position P2 and the second boundary W2. The control unit 12 calculates a fourth position P4 that has advanced a second distance y2 from the second position P2 toward the second boundary W2 in the width direction of the lane R (Y-axis direction in the figure). The fourth position P4 is a position where the vehicle 1 deviates from the second boundary W2.

The control unit 12 calculates a fourth position P4 based on the first position P1, the second position P2, and the second distance y2. The control unit 12 calculates a second straight line L2 connecting the first position P1 and the fourth position P4. The control unit 12 calculates a second angle θ2 of the second straight line L2 with respect to the straight line L. The above calculation method is an example, and other calculation methods may be used as long as the position of the vehicle 1 can be calculated.

Figure 3:
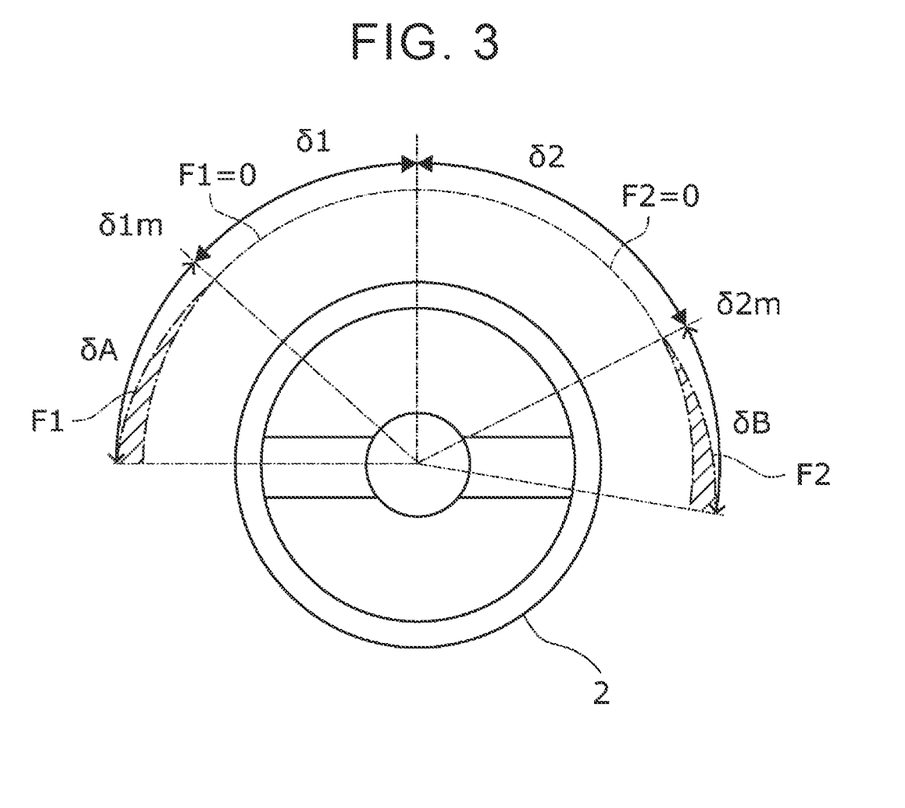
FIG. 3 is a diagram showing the relationship between the steering wheel operation amount and the limit operation amount at which a reaction force is generated.

FIG. 3 shows the relationship between the steering wheel 2 and the manipulated variable δ (steering angle). The steering angle sensor 14B detects a first operation amount δ1 in a first rotation direction (for example, a left rotation direction) of the steering wheel 2. The control unit 12 calculates a first limit operation amount δ1$m$ that is a threshold value at which the vehicle 1 deviates from the first boundary W1 at the first operation amount δ1. The first limit operation amount δ1$m$ is the operation amount δ of the steering wheel 2 corresponding to the first angle θ1 (see FIG. 2).

If the operation amount δ of the steering wheel 2 exceeds the first limit operation amount δ1$m$, it is expected that the vehicle 1 will deviate from the first boundary W1. The control unit 12 sets a first angle region δA in a predetermined angle region exceeding the first limit operation amount δ1$m$ in the first rotation direction of the steering wheel 2. The control unit 12 determines that the vehicle 1 has deviated from the first boundary W1 when the steering wheel 2 is in the first angle region δA exceeding the first limit operation amount δ1$m$, and performs first control for applying a reaction force to the steering wheel 2.

The steering angle sensor 14B detects a second operation amount δ in a second rotation direction (for example, right rotation direction) of the steering wheel 2. The control unit 12 calculates a second limit operation amount δ2$m$ that is a threshold value at which the vehicle 1 deviates from the second boundary W2 at the second operation amount δ2. The second limit operation amount δ2m is the operation amount δ of the steering wheel 2 corresponding to the second angle θ2 (see FIG. 2).

If the second operation amount δ2 of the steering wheel 2 exceeds the second limit operation amount δ2m, it is expected that the vehicle 1 will deviate from the second boundary W2. The control unit 12 sets a second angle region δB in a predetermined angle region exceeding the second limit operation amount 82m in the second rotation direction of the steering wheel 2. The control unit 12 determines that the vehicle 1 has deviated from the second boundary W2 and performs second control to apply a reaction force to the steering wheel 2, when the steering wheel 2 is in the second angle region δB exceeding the second limit operation amount δ2m.

The control unit 12 sets the reaction force device 16 not to output a reaction force when the first operation amount δ1 of the steering wheel 2 is less than or equal to the first limit operation amount δ1m. The control unit 12 sets the reaction force device 16 so that no reaction force is output when the second operation amount δ2 of the steering wheel 2 is less than or equal to the second limit operation amount δ2m. For example, the control unit 12 performs first control to increase the first reaction force F1 as the first operation amount δ1 of the steering wheel 2 increases from the first limit operation amount δ1m in the first rotation direction. For example, the control unit 12 performs second control to increase the second reaction force F2 as the second operation amount δ2 of the steering wheel 2 increases from the second limit operation amount δ2m in the second rotation direction.

The control unit 12 monitors the operation amount δ of the steering wheel 2 and determines whether it is close to either the first limit operation amount δ1m or the second limit operation amount δ2m. The control unit 12 compares the first difference between the operation amount δ of the steering wheel 2 and the first limit operation amount δ1m with the second difference between the operation amount δ of the steering wheel 2 and the second limit operation amount δ2m, and sets the boundary of the lane R corresponding to the smaller absolute value as a monitoring target. For example, when the absolute value of the first difference is smaller than the absolute value of the second difference, the control unit 12 sets the monitoring target of the boundary of the lane R to the first boundary W1. The control unit 12 performs the first control for applying a first reaction force F1 to the steering wheel 2 when the first distance y1 decreases while monitoring the first boundary W1 and when the steering wheel 2 is in the first angle region δA. For example, if the absolute value of the second difference is smaller than the absolute value of the first difference, the control unit 12 sets the monitoring target of the boundary of the lane R to the second boundary W2.

The control unit 12 applies a second reaction force F2 to the steering wheel 2 when the first distance y1 increases while monitoring the second boundary W2 and when the steering wheel 2 is in the second angle region δB. The second control to give is performed. The processing in the first control and the second control described above is an example, and other control methods may be applied as long as a reaction force can be applied to the steering wheel 2.

Figure 4A:
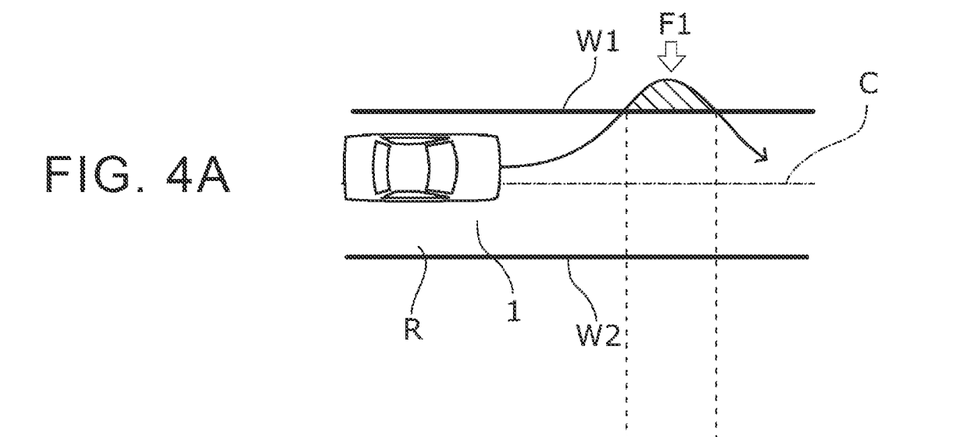
FIG. 4A is a diagram illustrating first control that suppresses the vehicle from deviating from the first boundary of the lane.
Figure 4B:
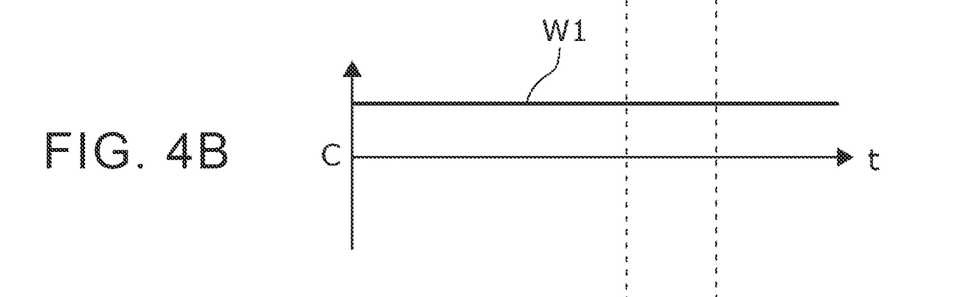
FIG. 4B is a diagram illustrating first control that suppresses the vehicle from deviating from the first boundary of the lane.
Figure 4C:
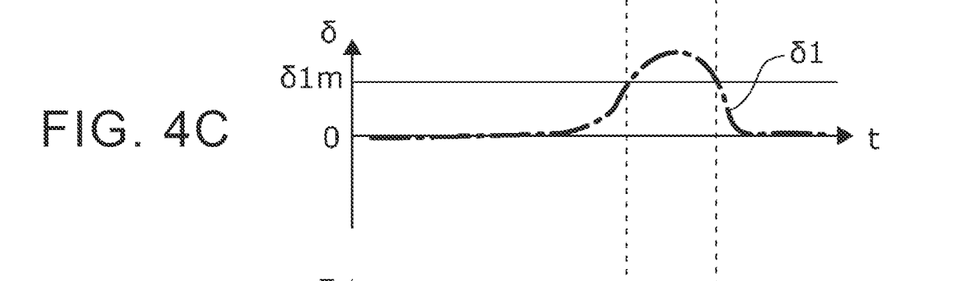
FIG. 4C is a diagram illustrating first control that suppresses the vehicle from deviating from the first boundary of the lane.
Figure 4D:
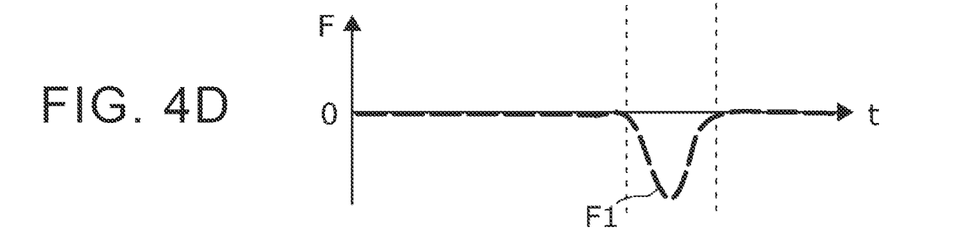
FIG. 4D is a diagram illustrating first control that suppresses the vehicle from deviating from the first boundary of the lane.

FIG. 4A shows a traveling trajectory in which the vehicle 1 deviates from the first boundary W1. When the vehicle 1 deviates from the first boundary W1, the control unit 12 applies a first reaction force F1 to the steering wheel 2 so as to return the vehicle 1 from the first boundary W1 into the lane R. FIG. 4B shows changes over time in the boundary of the lane R to be monitored. The control unit 12 monitors the first boundary W1. FIG. 4C shows a change over time in the operation amount δ of the steering wheel 2. FIG. 4D shows a change over time in the reaction force F applied to the steering wheel 2. As shown in the figure, when the first operation amount δ1 of the steering wheel 2 exceeds the first limit operation amount δ1m, a first reaction force F1 is applied to the steering wheel 2. When the first operation amount δ1 of the steering wheel 2 becomes equal to or less than the first limit operation amount δ1m, the first reaction force F1 applied to the steering wheel 2 is stopped.

When it is determined that the vehicle 1 will deviate from the first boundary W1 in the future, the control unit 12 uses the first detection value of the first boundary W1 detected by the detection unit 14 and the direction of the own vehicle in the direction of the first boundary W1. Based on the first operation amount δ1 in the first rotational direction of the steering wheel 2 for driving the vehicle, a first limit operation amount δ1m that deviates from the first boundary W1 in the first operation amount δ1 is calculated. The control unit 12 performs the first control when the amount of operation of the steering wheel 2 exceeds the first limit amount of operation. The driver can return the vehicle 1 to the lane R by operating the steering wheel 2 in a direction of rotation that reduces the first reaction force F1 of the steering wheel 2.

Figure 5A:
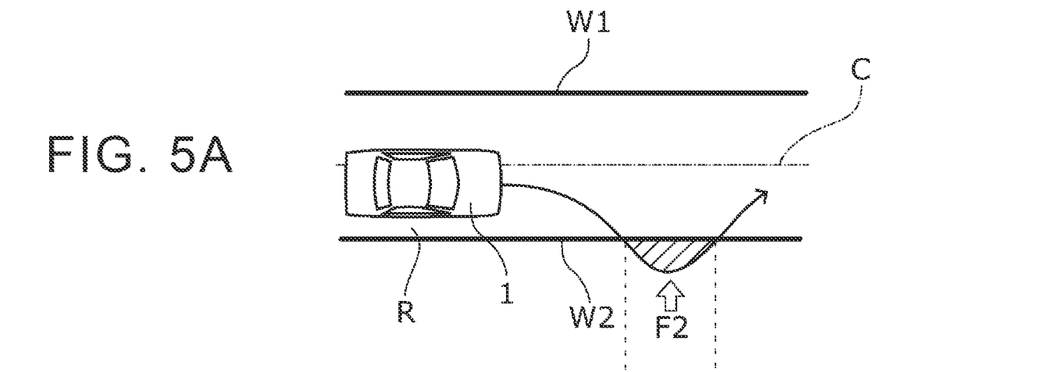
FIG. 5A is a diagram illustrating second control that suppresses the vehicle from deviating from the second boundary of the lane.
Figure 5B:
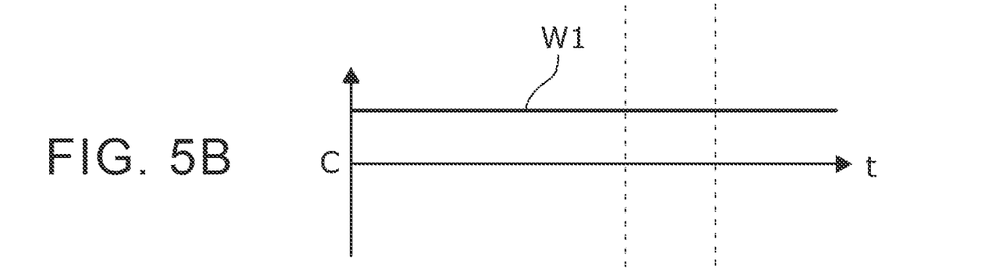
FIG. 5B is a diagram illustrating second control that suppresses the vehicle from deviating from the second boundary of the lane.
Figure 5C:
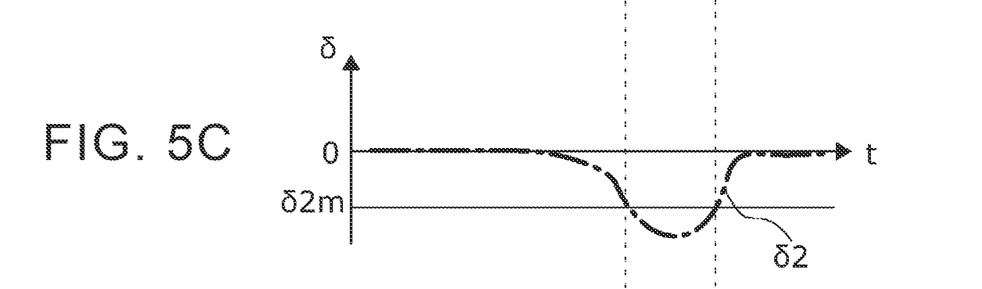
FIG. 5C is a diagram illustrating second control that suppresses the vehicle from deviating from the second boundary of the lane.
Figure 5D:
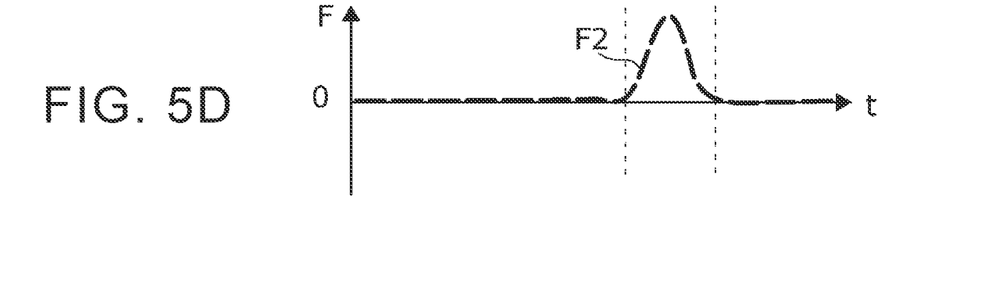
FIG. 5D is a diagram illustrating second control that suppresses the vehicle from deviating from the second boundary of the lane.

FIG. 5A shows a travel trajectory in which the vehicle 1 deviates from the second boundary W2. When the vehicle 1 deviates from the second boundary W2, the control unit 12 applies a second reaction force F2 to the steering wheel 2 so as to return the vehicle 1 from the second boundary W2 into the lane R. FIG. 5B shows changes over time in the boundary of the lane R to be monitored. The control unit 12 monitors the second boundary W2. FIG. 5C shows a change over time in the operation amount δ of the steering wheel 2. FIG. 5D shows a change over time in the reaction force F applied to the steering wheel 2. As shown in the figure, when the second operation amount δ of the steering wheel 2 exceeds the second limit operation amount δ2m, a second reaction force F2 is applied to the steering wheel 2. When the second operation amount δ2 of the steering wheel 2 becomes equal to or less than the second limit operation amount δ2m, the second reaction force F2 applied to the steering wheel 2 is stopped.

When it is determined that the vehicle 1 will deviate from the second boundary W2 in the future, the control unit 12 calculates, based on the second detection value of the second boundary W2 detected by the detection unit 14 and a second operation amount in a second rotation direction opposite to the first rotation direction of the steering wheel 2 for driving the vehicle 1 in the direction of the second boundary W2, the second limit operation amount that deviates from the second boundary in the second operation amount. The control unit 12 performs the second control when the amount of operation of the steering wheel 2 exceeds the second limit amount of operation. The driver can return the vehicle 1 to the lane R by operating the steering wheel 2 in a direction of rotation that reduces the second reaction force F2 of the steering wheel 2.

Figure 6A:
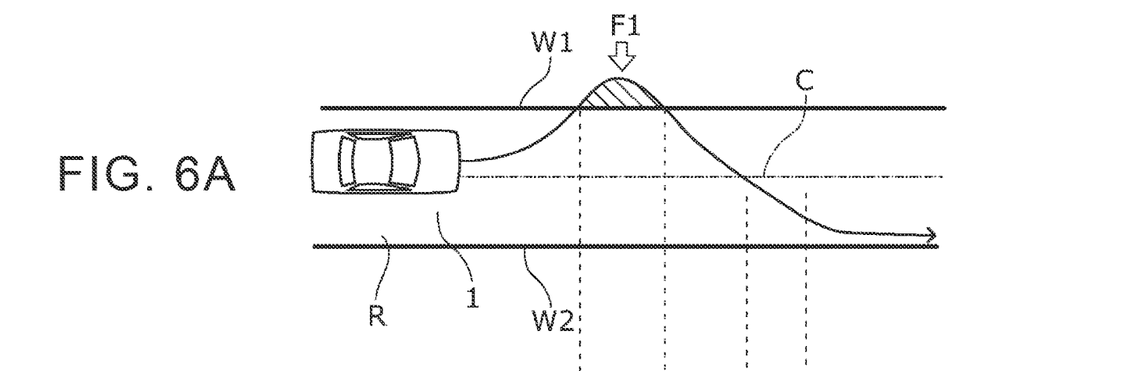
FIG. 6A is a diagram illustrating a control method for limiting reaction force.
Figure 6B:
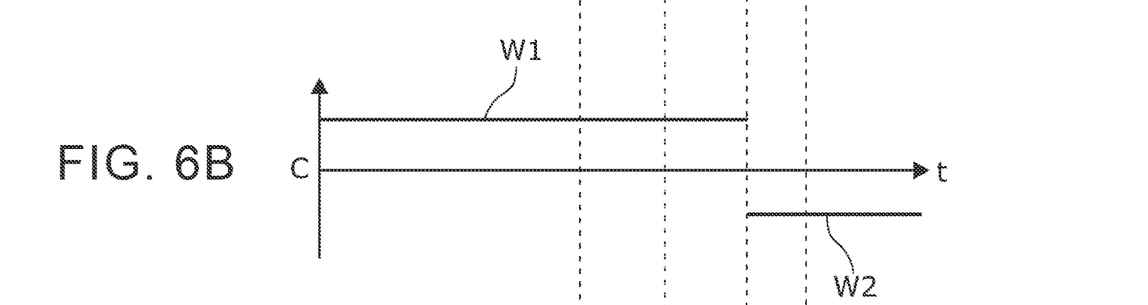
FIG. 6B is a diagram illustrating a control method for limiting reaction force.

As shown in FIGS. 6A to 6E, a process when the control unit 12 switches the monitoring target of the boundary of the lane R from the first boundary W1 to the second boundary W2 will be described. FIG. 6A shows a traveling locus in the case where the vehicle 1 travels in the lane R closer to the first boundary W1 side and then closer to the second boundary W2 side. FIG. 6B shows changes over time in the boundary of the lane R to be monitored. As shown in the figure, the monitoring target for the boundary of the lane R continues to be the first boundary W1, and is switched to the second boundary W2 at an intermediate timing. Since the control unit 12 outputs the calculation result based on the frame rate of the camera sensor 14A, the monitoring target of the boundary of the lane R is immediately switched from the first boundary W1 to the second boundary W2.

Figure 6C:
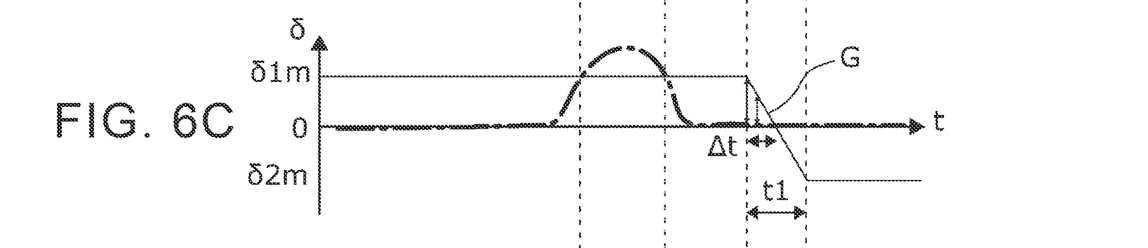
FIG. 6C is a diagram illustrating a control method for limiting reaction force.

FIG. 6C shows a change over time in the operation amount δ of the steering wheel 2. Since the steering angle sensor 14B detects rotation angle data of the steering wheel 2 based on a predetermined sampling rate, the detection result of the operation amount δ of the steering wheel 2 is discretized at a predetermined sampling time. Therefore, the control unit 12 discretely changes the calculation results of the first limit operation amount δ1m and the second limit operation amount δ2m, which are the threshold values of the steering wheel 2. At a first timing when the monitoring target of the boundary of the lane R switches from the first boundary W1 to the second boundary W2, the control unit 12 changes the threshold of the operation amount of the steering wheel 2 from the first limit operation amount δ1m to the second limit operation amount. A rate guard G is set for continuity with δ2m.

As shown in the figure, as a result of setting the rate guard G in the calculation result of the limit operation amount that is the threshold value of the steering wheel 2, in the rate guard section t1 in which the rate guard G is provided, there is a minute time Δt in which the control unit 12 determines that the vehicle 1 has deviated from the second boundary W2. During the minute time Δt, the control unit 12 switches the monitoring target of the boundary of the lane R to the second boundary W2. In the minute time Δt, the control unit 12 reduces the limit operation amount of the steering wheel 2 from the first limit operation amount δ1m to 0 based on the rate guard G. Then, the control unit 12 determines that the operation amount δ of the steering wheel 2 exceeds the limit operation amount for the second boundary W2 during the minute time Δt.

Figure 6D:
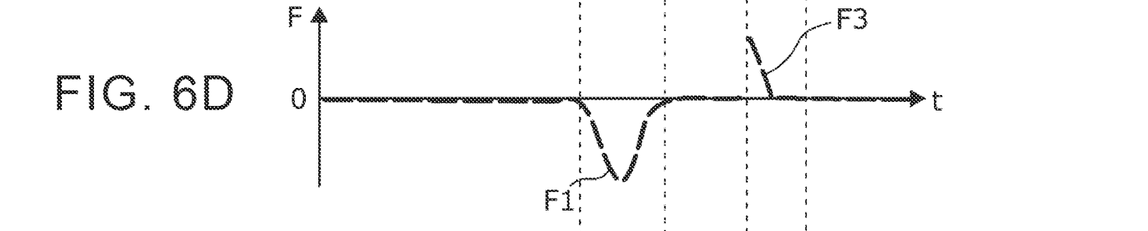
FIG. 6D is a diagram illustrating a control method for limiting reaction force.
Figure 6E:
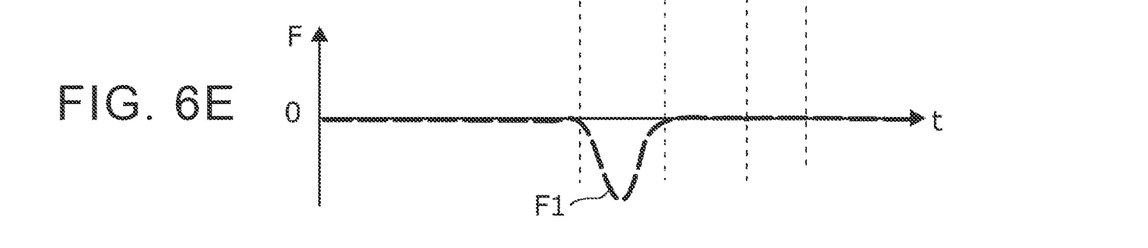
FIG. 6E is a diagram illustrating a control method for limiting reaction force.

FIG. 6D shows a change over time in the reaction force F applied to the steering wheel 2. As shown in the figure, when performing the above-mentioned normal control at the minute time Δt of the first timing, the control unit 12 applies a third reaction force F3 to the steering wheel 2 based on the second control to determine that the vehicle 1 has deviated from the second boundary W2. At this time, the driver may feel uncomfortable with the third reaction force F3 applied to the steering wheel 2. FIG. 6E shows a method of controlling the reaction force F at the first timing. The control unit 12 limits the reaction force F output from the reaction force device 16 for a predetermined period of time at a first timing when the monitoring target for deviation from the lane R is switched from the first boundary W1 to the second boundary W2.

The predetermined time: $t_{hold}$ [s] is calculated based on the following formula (1), for example.

$$t_{hold} = |\delta'_{max} - \delta'_{premax}|/r \quad (1)$$

However, $\delta'_{max}$ [deg]: current limit operation amount before rate guard execution, $\delta'_{premax}$ [deg]: previous limit operation amount before rate guard execution, r [deg/s]: rate guard value. The predetermined time may be set to a first time interval that is at least a minute time Δt or more from the start of the rate guard interval t1 at the first timing. The predetermined time may be a constant value.

At the first timing, the control unit 12 determines that the vehicle 1 deviates from the second boundary W2 at a first time interval when switching the threshold of the operation amount of the steering wheel 2 from the first limit operation amount δ1m to the second limit operation amount δ2m. In the case where it is determined that the second control is restricted. For example, at the first timing, the control unit 12 limits the second control so as not to output the third reaction force F3 output from the reaction force device 16 at least during the minute time Δt. Thereby, the driver can operate the steering wheel 2 without feeling any discomfort at the first timing.

Similarly, at a second timing when the monitoring target of the boundary of the lane R switches from the second boundary W2 to the first boundary W1, the control unit 12 sets a rate guard G for maintaining the threshold value of the operation amount of the steering wheel 2 from the second limit operation amount δ2m to the first limit operation amount δ2m. The control unit 12 limits the reaction force F output from the reaction force device 16 for a predetermined time at a second timing when the monitoring target for deviation from the lane R is switched from the second boundary W2 to the first boundary W1.

When it is determined that the vehicle 1 has deviated from the first boundary W1 at the second time interval when the threshold value of the operation amount of the steering wheel 2 is changed from the second limit operation amount δ2m to the first limit operation amount δ1m at the second timing, the control unit 12 limits the first control. For example, at the second timing, the control unit 12 limits the first control so as not to output the fourth reaction force output from the reaction force device 16 at least during the minute time Δt. Thereby, the driver can operate the steering wheel 2 without feeling any discomfort at the second timing.

Figure 7:
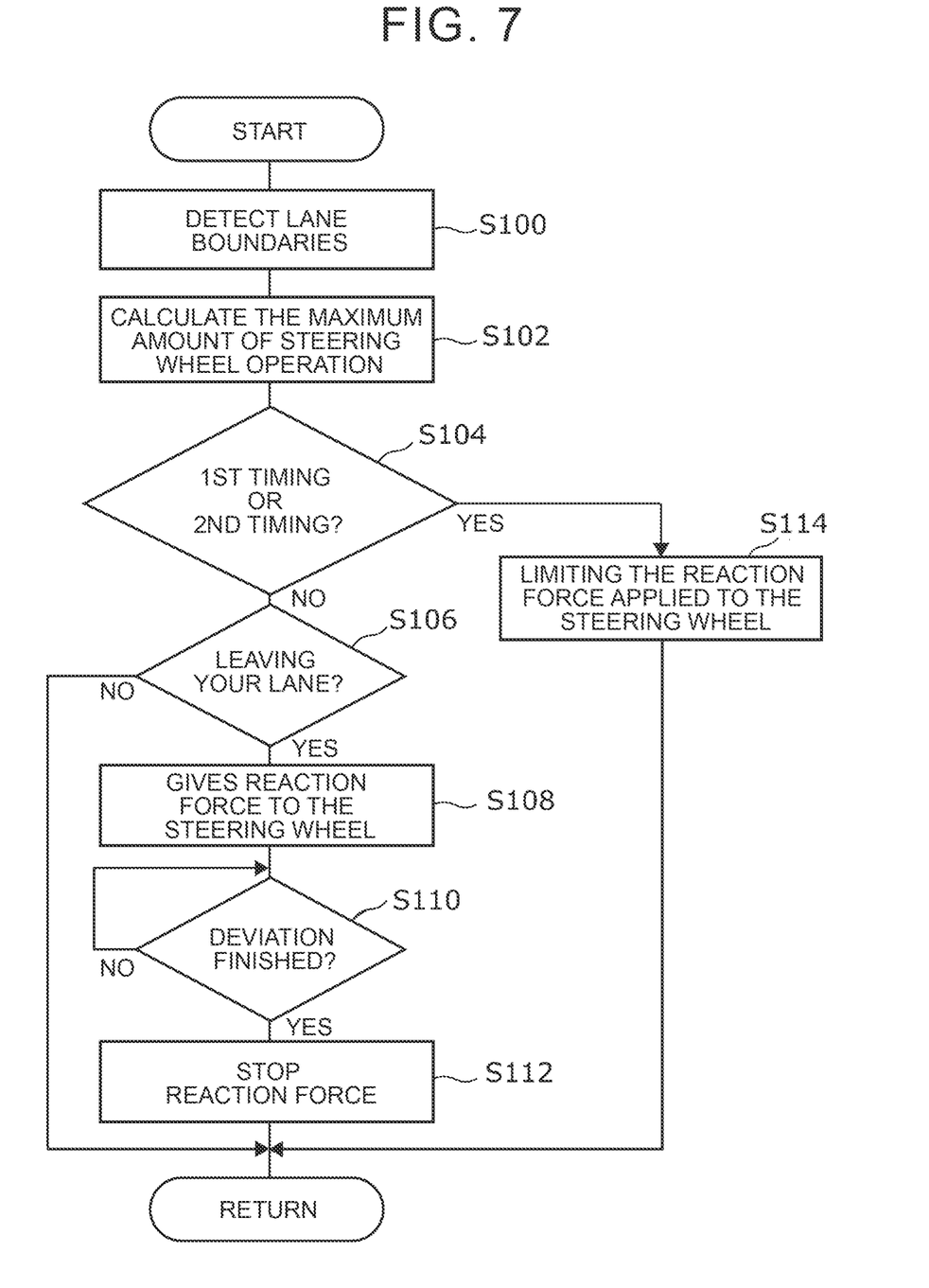
FIG. 7 is a flowchart showing the process flow of the steering control method.

FIG. 7 shows the process flow of the steering control method executed in the steering control device 10. The control unit 12 detects the boundary of the lane R in which the vehicle 1 travels based on the detection data of the detection unit 14 (S100). The control unit 12 calculates the reaction force F applied to the steering wheel 2 based on the relative position of the vehicle 1 in the lane R and the detection results of the first boundary W1 and the second boundary W2 (S102). Based on the relative position of the vehicle 1 in the lane R and the detection results of the first boundary W1 and the second boundary W2, the control unit 12 determines whether the monitoring target of the boundary of the lane R is switched to a first timing or a second timing (S104).

If the determination result in step 104 is negative, the control unit 12 compares the operation amount of the steering wheel 2 with a threshold operation amount, and determines whether the vehicle 1 has deviated from the lane R (S106). If the determination result in step 106 is negative, the control unit 12 stops the process and restarts the process from step 100. If the determination result in step 106 is positive, the control unit 12 controls the reaction force device 16 to apply a reaction force in the rotational direction of the steering wheel 2 (step S108).

When it is determined that the vehicle 1 will deviate from the first boundary W1 in the future, the control unit uses the first detection value of the first boundary W1 calculated based on the detection result and moves the vehicle 1 in the direction of the first boundary W1. Based on the first operation amount δ1 in the first rotational direction of the steering wheel for driving, calculate a first limit operation amount δ1m that is a threshold value at which the vehicle 1 deviates from the first boundary W1 at the first operation amount δ1. However, when the operation amount of the steering wheel 2 exceeds the first limit operation amount δ1m, the first control is performed.

When it is determined that the vehicle 1 will deviate from the second boundary W2 in the future, the control unit uses the second detection value of the second boundary W2 calculated based on the detection result and moves the vehicle 1 in the direction of the second boundary W2. Based on the second operation amount δ2 in the second rotation direction of the steering wheel for driving, calculate a second limit operation amount δ2m that is a threshold value at which the vehicle 1 deviates from the second boundary W2 at the second operation amount δ2. However, when the operation amount of the steering wheel 2 exceeds the second limit operation amount δ2m, the second control is performed. The control unit 12 determines whether the vehicle 1 has stopped deviating from the lane R (step 110).

If the determination result in step 110 is negative, the control unit 12 executes the process in step 110 again. If the determination result in step 110 is positive, the control unit 12 controls the reaction force device 16 to stop the reaction force output to the steering wheel 2 (step 112). After step 112, processing begins again at step 100. If the determination result in step 104 is positive, the control unit 12 limits the reaction force output from the reaction force device 16 for a predetermined period of time (step 114). After step 114, processing begins again at step 100.

As described above, according to the steering control device 10, by limiting the reaction force F applied to the steering wheel 2 from the reaction force device 16 at the first timing or the second timing when the monitoring target of the boundary of the lane R changes, It is possible to suppress the driver from feeling uncomfortable.

In the embodiments described above, the computer program executed in each component of the steering control device 10 may be provided in a form recorded on a computer-readable portable recording medium such as a semiconductor memory, a magnetic recording medium, or an optical recording medium.

In the embodiment of the steering control device 10 described above, each process by the control unit 12 may be applied not only to suppress the vehicle 1 from deviating from the first boundary W1 or the second boundary W2 in the lane R, but also when the vehicle 1 changes lanes between the adjacent two lanes. The first boundary W1 and the second boundary W2 recognized in the lane R may be not only lane marks actually displayed on the road surface but also virtual lane marks set by the steering control device 10. Moreover, the first boundary W1 or the second boundary W2 may be a side surface of a structure or an obstacle.

What is claimed is:

1. A steering control device comprising:
   a detection unit that detects a lane in which a host vehicle is traveling;
   a reaction force device that applies a reaction force with respect to a steering direction of a steering wheel for operating a steering device of the host vehicle; and
   a control unit that recognizes a position of the host vehicle in the lane based on a detection result of the lane and that outputs the reaction force from the reaction force device in order to suppress the host vehicle from departing from the lane, wherein
   the control unit is configured to
      perform, based on a detection result of a pair of a first boundary and a second boundary of the lane, first control in which the reaction force is applied to the steering wheel by controlling the reaction force device in order to suppress the host vehicle from departing from the first boundary, or perform second control in which the reaction force is applied to the steering wheel by controlling the reaction force device in order to suppress the host vehicle from departing from the second boundary,
      restrict the reaction force output from the reaction force device during a predetermined time at a first timing when a target to be monitored for departure from the lane is switched from the first boundary to the second boundary, or at a second timing when the target to be monitored for departure from the lane is switched from the second boundary to the first boundary, and
   the control unit is further configured to
      when it is determined that the host vehicle will depart from the first boundary in a future, calculate a first limit operation amount based on a first detection value for the first boundary calculated based on the detection result and a first operation amount in a first rotational direction of the steering wheel for causing the host vehicle to travel in a direction of the first boundary, the host vehicle departing from the first boundary by the first limit operation amount with the first operation amount,
      perform the first control when an operation amount of the steering wheel exceeds the first limit operation amount,
      when it is determined that the host vehicle will depart from the second boundary in the future, calculate a second limit operation amount based on a second detection value for the second boundary calculated based on the detection result and a second operation amount in a second rotational direction of the steering wheel for causing the host vehicle to travel in a direction of the second boundary, the second rotational direction being opposite to the first rotational direction of the steering wheel, and the host vehicle departing from the second boundary by the second limit operation amount with the second operation amount,
      perform the second control when the operation amount of the steering wheel exceeds the second limit operation amount,
      restrict the second control when it is determined that the host vehicle has departed from the second boundary during a first time interval during which a threshold for the steering wheel is switched from the first limit operation amount to the second limit operation amount at the first timing, and
      restrict the first control when it is determined that the host vehicle has departed from the first boundary during a second time interval during which the threshold for the steering wheel is switched from the second limit operation amount to the first limit operation amount at the second timing.

2. The steering control device according to claim 1, wherein the control unit restricts the second control such that the reaction force is not output from the reaction force device at the first timing.

3. The steering control device according to claim 2, wherein the control unit restricts the first control such that the reaction force is not output from the reaction force device at the second timing.

* * * * *